(12) United States Patent
Zhang et al.

(10) Patent No.: US 11,190,126 B2
(45) Date of Patent: Nov. 30, 2021

(54) SPACE VECTOR PULSE WIDTH MODULATION FOR MULTI-PHASE MACHINES

(71) Applicant: STEERING SOLUTIONS IP HOLDING CORPORATION, Saginaw, MI (US)

(72) Inventors: Zhe Zhang, Fenton, MI (US); Prerit Pramod, Saginaw, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 260 days.

(21) Appl. No.: 16/568,777

(22) Filed: Sep. 12, 2019

(65) Prior Publication Data

US 2021/0083615 A1 Mar. 18, 2021

(51) Int. Cl.
*H02P 27/12* (2006.01)
*B62D 5/04* (2006.01)
*H02P 21/22* (2016.01)

(52) U.S. Cl.
CPC ............ *H02P 27/12* (2013.01); *B62D 5/0463* (2013.01); *H02P 21/22* (2016.02)

(58) Field of Classification Search
CPC ........ H02P 27/12; H02P 21/22; B62D 5/0463
See application file for complete search history.

(56) References Cited

U.S. PATENT DOCUMENTS

| 5,706,186 A | 1/1998 | Blasko |
| 6,023,417 A | 2/2000 | Hava et al. |
| 10,153,714 B2 | 12/2018 | Zhang et al. |
| 2011/0187304 A1 | 8/2011 | Anwar et al. |
| 2012/0206064 A1* | 8/2012 | Archenhold ........... H05B 45/10 315/297 |

(Continued)

FOREIGN PATENT DOCUMENTS

DE 102011004817 A1 12/2011

(Continued)

OTHER PUBLICATIONS

Halász, Sándor. "Comparison of Sinusoidal Pulsewidth-Modulation Methods." Periodica Polytechnica Electrical Engineering 37.4 (1993): 273-290.

(Continued)

*Primary Examiner* — Zoheb S Imtiaz
(74) *Attorney, Agent, or Firm* — Dickinson Wright PLLC

(57) ABSTRACT

Technical solutions are described for controlling operation of a multiphase electric machine using a signal generator configured to generate n number of duty cycle signals of a combination pulse width modulation (PWM) scheme comprising of a continuous PWM scheme and a noncontinuous PWM scheme, with n being an integer greater than 3. A blending coefficient value determines relative weights of each of the continuous and noncontinuous PWM schemes in forming the combination PWM scheme. A blending function determines relative weights of each of the continuous PWM scheme and the noncontinuous PWM scheme used to generate the duty cycle signals. The bending function is calculated piecewise based on a difference between the blending coefficient value and two threshold values. The signal generator uses each of the duty cycle signals to control switching of a DC power to a corresponding phase of the multiphase electric machine.

16 Claims, 8 Drawing Sheets

(56) References Cited

U.S. PATENT DOCUMENTS

| | | | |
|---|---|---|---|
| 2013/0038273 A1* | 2/2013 | Riggio | H02J 7/00 |
| | | | 320/107 |
| 2013/0066501 A1 | 3/2013 | Oyama et al. | |
| 2014/0118414 A1* | 5/2014 | Seo | H05B 45/44 |
| | | | 345/690 |
| 2015/0280619 A1 | 10/2015 | Marohl et al. | |
| 2016/0322890 A1 | 11/2016 | Lee et al. | |

OTHER PUBLICATIONS

Infineon Technologies AG, Different PWM Waveforms Generation for 3-Phase AC Induction Motor with XC164CS; AP16097, Jul. 2006.

Kennel, R. "Power Electronics Exercise: Pulse Width Modulation Methods." Technische Universität München (2013).

Khan, Mohammad Arif, Atif Iqbal, and Abu Rub Haitham. "Investigation of discontinuous space vector PWM techniques of a three phase voltage source inverter." i-Manager's Journal on Electrical Engineering 2.3 (2009): 60.

Knight, Andy "Sinusoidal PWM (SPWM)."

Lee, Hak-Jun, et al. "A carrier-based adjustable discontinuous PWM for three-phase voltage source inverter." 2015 IEEE Energy Conversion Congress and Exposition (ECCE). IEEE, 2015.

Nayeemuddin, M., and Dr C. Srinivasa Rao. "Digital Scalar Pulse Width Modulation Methods for Voltage Source Inverter Fed AC Drive." International Journal of Scientific Research Engineering & Technology (IJSRET), vol. 5, Issue 7, Jul. 2016.

Sridevi, C. H., and I. Ravikiran. "Comparative Analysis of SVPWM and DSVPWM Control Techniques for a Single-Phase to Three-Phase Conversion System."

Wölfle, Julian Felix, and Jörg Roth-Stielow. "A hybrid discontinuous modulation technique to influence the switching losses of three phase inverters." 2015 17th European Conference on Power Electronics and Applications (EPE'15 ECCE-Europe). IEEE, 2015.

Citation of documents considered in corresponding DE patent application 10 2020 123 663.8, dated Mar. 19, 2021.

0. Ojo: The generalized discontinuous PWM scheme for three-phase voltage source inverters. IEEE Transactions on Industrial Electronics, vol. 51, Dec. 2004, No. 6, 1280-1289. IEEE [online].

* cited by examiner

SPACE VECTOR PULSE WIDTH MODULATION FOR MULTI-PHASE MACHINES

BACKGROUND

The present application is generally related to methods and systems for controlling electric machines, and more particularly to methods and systems for generating duty cycle signals used for control of an alternating current (AC) electric machines having n phases, in which n is an integer greater than 3.

A controller typically controls an AC machine motor by generating duty cycle signals for each motor phase, e.g., using pulse width modulation (PWM) techniques, which are used to provide phase voltage signals to the motor. For example, electric motors are generally controlled by a feedback system including a current regulator and a modulator that uses a sinusoidal PWM scheme to generate and transmit gate drive signals to a three-phase inverter (DC-AC converter). The inverter supplies voltage signals for each phase of an electric motor. The voltages produced by the inverter are heavily dependent on the inverter control scheme used, and sub-optimal techniques can result in undesirable torque ripple and audible noise in high performance applications such as electric power steering (EPS).

Redundancy is required in safety-critical applications, such as for motors used in EPS systems. Typically, two or more three-phase machines are used in conventional safety-critical applications to provide the requisite redundancy. Multiphase AC machines, i.e., machines with number of phases greater than 3, have significant potential to replace currently ubiquitous electric motor drive configurations that provide redundancy in safety-critical applications.

SUMMARY

According to one or more embodiments, a control system for controlling operation of a multiphase electric machine comprises a signal generator configured to generate n number of duty cycle signals of a pulse width modulation (PWM) scheme, where n is an integer greater than 3. The PWM scheme is a combination of a continuous PWM scheme and a noncontinuous PWM scheme. The combination is based on a blending coefficient value. The signal generator is configured to use each of the duty cycle signals to control switching of a DC power to a corresponding phase of the multiphase electric machine.

According to one or more embodiments, a method of controlling a multiphase electric machine includes generating n number of duty cycle signals by a signal generator using a pulse width modulation (PWM) scheme, wherein n is an integer greater than 3. The PWM scheme is a combination of a continuous PWM scheme and a noncontinuous PWM scheme. The combination is based on a blending coefficient value. The method further includes switching power to each of n number of phases of the multiphase electric machine using an associated one of the duty cycle signals.

These and other advantages and features will become more apparent from the following description taken in conjunction with the drawings.

BRIEF DESCRIPTION OF THE DRAWINGS

The subject matter of the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Referring now to the figures, where the present disclosure will be described with reference to specific embodiments, without limiting the same, it is to be understood that the disclosed embodiments are merely illustrative of the present disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

As used herein the terms module and sub-module refer to one or more processing circuits such as an application specific integrated circuit (ASIC), an electronic circuit, a processor (shared, dedicated, or group) and memory that executes one or more software or firmware programs, a combinational logic circuit, and/or other suitable components that provide the described functionality. As can be appreciated, the sub-modules described below can be combined and/or further partitioned.

Figure 1:
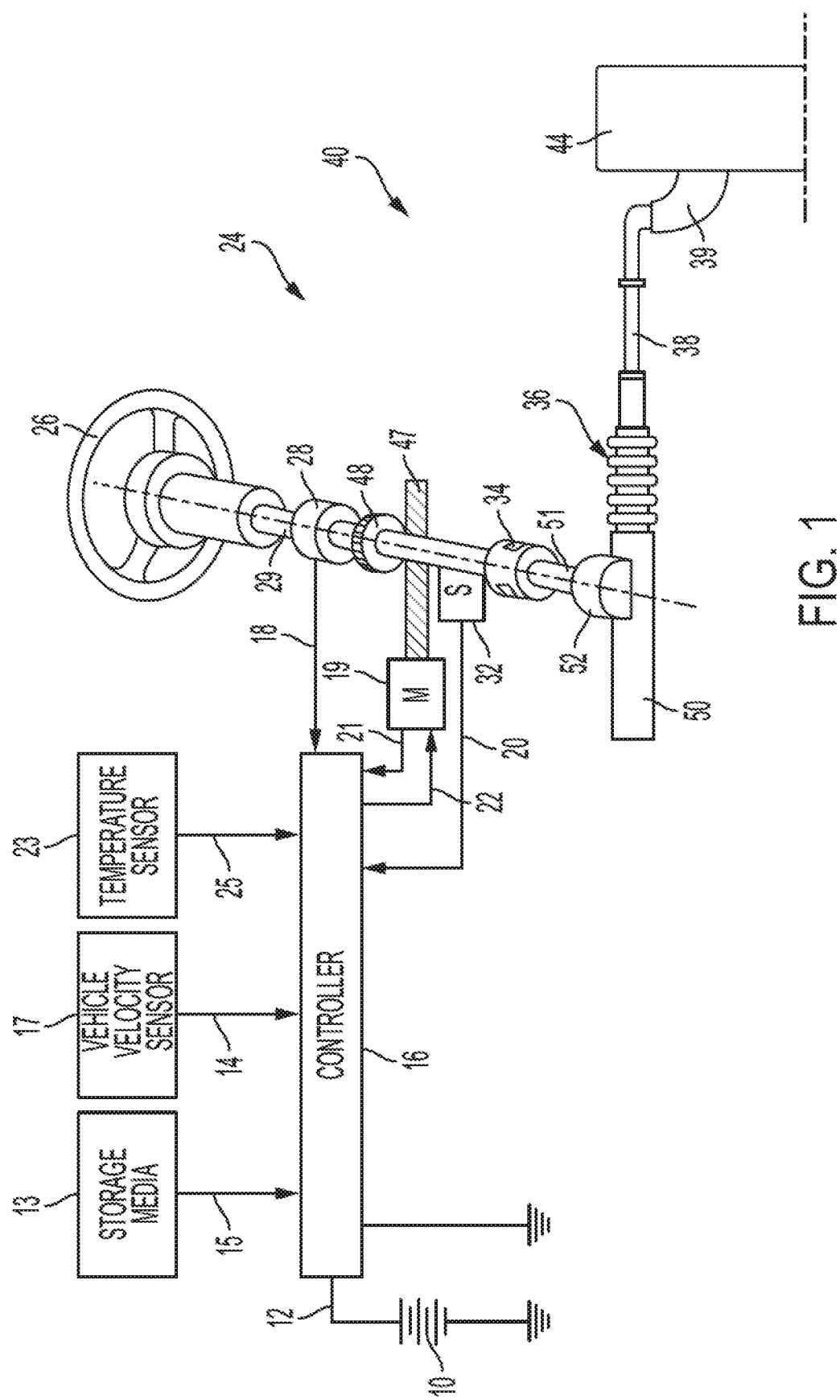
FIG. 1 depicts a block diagram of an exemplary embodiment of an electric power steering system according to aspects of the present disclosure.

Referring now to the figures, where the technical solutions will be described with reference to specific embodiments, without limiting same, FIG. 1 is an exemplary embodiment of an electric power steering system (EPS) 40 suitable for implementation of the disclosed embodiments. The steering mechanism 36 is a rack-and-pinion type system and includes a toothed rack (not shown) within housing 50 and a pinion gear (also not shown) located under gear housing 52. As the operator input, hereinafter denoted as a steering wheel 26 (e.g., a hand wheel and the like), is turned, the upper steering shaft 29 turns and the lower steering shaft 29 51, connected to the upper steering shaft 29 through universal joint 34, turns the pinion gear. Rotation of the pinion gear moves the rack, which moves tie rods 38 (only one shown) in turn moving the steering knuckles 39 (only one shown), which turn a steerable wheel(s) 44 (only one shown).

Electric power steering assist is provided through the control apparatus generally designated by reference numeral 24 and includes the controller 16 and an electric machine 19, which could be a permanent magnet synchronous motor (PMSM), and is hereinafter denoted as electric machine 19. The controller 16 is powered by the vehicle power supply 10 through line 12. The controller 16 receives a vehicle speed signal 14 representative of the vehicle velocity from a vehicle velocity sensor 17. Steering angle is measured through position sensor 32, which may be an optical encoding type sensor, variable resistance type sensor, or any other suitable type of position sensor, and supplies to the controller 16 a position signal 20. Motor velocity may be measured with a tachometer, or any other device, and transmitted to controller 16 as a motor velocity signal 21. A motor velocity denoted ωm may be measured, calculated or a combination thereof. For example, the motor velocity ωm may be calculated as the change of the motor position θ as measured by a position sensor 32 over a prescribed time interval. For example, motor speed ωm may be determined as the derivative of the motor position θ from the equation ωm=Δθ/Δt where Δt is the sampling time and Δθ is the change in position during the sampling interval. Alternatively, motor velocity may be derived from motor position as the rate of change of position with respect to time. It will be appreciated that there are numerous well-known methodologies for performing the function of a derivative.

As the steering wheel 26 is turned, torque sensor 28 senses the torque applied to the steering wheel 26 by the vehicle operator. The torque sensor 28 may include a torsion bar (not shown) and a variable resistive-type sensor (also not shown), which outputs a variable torque signal 18 to controller 16 in relation to the amount of twist on the torsion bar. Although this is one type of torque sensor, any other suitable torque-sensing device used with known signal processing techniques will suffice. In response to the various inputs, the controller sends a command 22 to the electric motor 19, which supplies torque assist to the steering system through worm 47 and worm gear 48, providing torque assist to the vehicle steering.

It should be noted that although the disclosed embodiments are described by way of reference to motor control for electric steering applications, it will be appreciated that such references are illustrative only and the disclosed embodiments may be applied to any motor control application employing an electric motor, e.g., steering, valve control, and the like. Moreover, the references and descriptions herein may apply to many forms of parameter sensors, including, but not limited to torque, position, speed and the like. It should also be noted that reference herein to electric machines including, but not limited to, motors, hereafter, for brevity and simplicity, reference will be made to motors only without limitation.

In the control system 24 as depicted, the controller 16 utilizes the torque, position, and speed, and like, to compute a command(s) to deliver the required output power. Controller 16 is disposed in communication with the various systems and sensors of the motor control system. Controller 16 receives signals from each of the system sensors, quantifies the received information, and provides an output command signal(s) in response thereto, in this instance, for example, to the motor 19. Controller 16 is configured to develop the corresponding voltage(s) out of inverter (not shown), which may optionally be incorporated with controller 16 and will be referred to herein as controller 16, such that, when applied to the motor 19, the desired torque or position is generated. In one or more examples, the controller 16 operates in a feedback control mode, as a current regulator, to generate the command 22. Alternatively, in one or more examples, the controller 16 operates in a feedforward control mode to generate the command 22. Because these voltages are related to the position and speed of the motor 19 and the desired torque, the position and/or speed of the rotor and the torque applied by an operator are determined. A position encoder is connected to the lower steering shaft 51 to detect the angular position θ. The encoder may sense the rotary position based on optical detection, magnetic field variations, or other methodologies. Typical position sensors include potentiometers, resolvers, synchros, encoders, and the like, as well as combinations comprising at least one of the foregoing. The position encoder outputs a position signal 20 indicating the angular position of the lower steering shaft 51 and thereby, that of the motor 19.

Desired torque may be determined by one or more torque sensors 28 transmitting torque signals 18 indicative of an applied torque. One or more exemplary embodiments include such a torque sensor 28 and the torque signal(s) 18 therefrom, as may be responsive to a compliant torsion bar, T-bar, spring, or similar apparatus (not shown) configured to provide a response indicative of the torque applied.

In one or more examples, a temperature sensor(s) 23 located at the electric machine 19. Preferably, the temperature sensor 23 is configured to directly measure the temperature of the sensing portion of the motor 19. The temperature sensor 23 transmits a temperature signal 25 to the controller 16 to facilitate the processing prescribed herein and compensation. Typical temperature sensors include thermocouples, thermistors, thermostats, and the like, as well as combinations comprising at least one of the foregoing sensors, which when appropriately placed provide a calibratable signal proportional to the particular temperature.

The position signal 20, velocity signal 21, and a torque signal(s) 18 among others, are applied to the controller 16. The controller 16 processes all input signals to generate values corresponding to each of the signals resulting in a rotor position value, a motor speed value, and a torque value being available for the processing in the algorithms as prescribed herein. Measurement signals, such as the above mentioned are also commonly linearized, compensated, and filtered as desired to enhance the characteristics or eliminate undesirable characteristics of the acquired signal. For example, the signals may be linearized to improve processing speed, or to address a large dynamic range of the signal. In addition, frequency or time-based compensation and filtering may be employed to eliminate noise or avoid undesirable spectral characteristics.

In order to perform the prescribed functions and desired processing, as well as the computations therefore (e.g., the identification of motor parameters, control algorithm(s), and the like), controller 16 may include, but not be limited to, a processor(s), computer(s), DSP(s), memory, storage, register(s), timing, interrupt(s), communication interface(s), and input/output signal interfaces, and the like, as well as combinations comprising at least one of the foregoing. For example, controller 16 may include input signal processing and filtering to enable accurate sampling and conversion or acquisitions of such signals from communications interfaces. Additional features of controller 16 and certain processes therein are thoroughly discussed at a later point herein.

The need for fault tolerance in safety-critical applications such as EPS system is ever-increasing. Dual-wound three-phase permanent magnet synchronous machines (PMSMs) are currently employed for providing fault tolerance for failures in the electrical actuator utilized in EPS systems. These machines are typically combined with two inverters and/or microcontrollers for providing complete electrical redundancy. However, when half the system fails, the total assist that may be provided is reduced to half. This may be increased only slightly by over-utilizing the remaining half system.

A potential alternative to dual-wound machines is multiphase synchronous machines (where PMSMs fall within the broader category of synchronous machines). These machines consist of n number of phases, where n is an integer greater than three, and where each phase may be controlled independently. Thus, under single-point inverter or machine failures, the total system capability is much higher than dual-wound machine based electric drive systems. However, very little work has been done for the control of power converters used with multiphase machines, and thus such machines cannot easily be employed for industrial applications. The basic sinusoidal PMW (SPWM) commutation technique, which has relatively low voltage utilization, is typically employed for multiphase drive systems presently.

Figure 2:
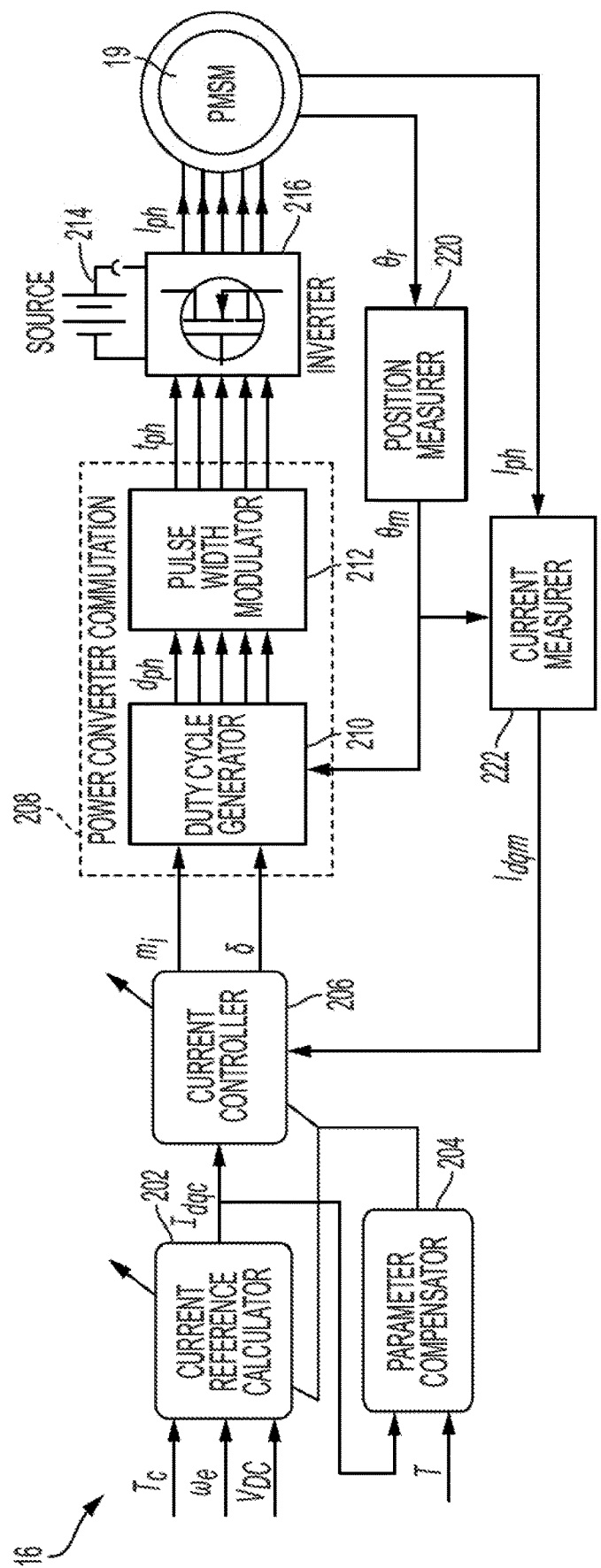
FIG. 2 depicts a block diagram of a five-phase permanent magnet synchronous motor controller according to aspects of the present disclosure.

FIG. 2 depicts a block diagram of a five-phase PMSM controller 16 according to aspects of the present disclosure. However, the PMSM controller 16 and the motor 19 may have any number n of phases, where n is an integer greater than 3. In other words, the system and method of the present disclosure may be used with a controller and/or an electric machine, such as a motor, that has 4, 5, 6, 7, 8, 9, etc. number of phases. A current command module (e.g. current reference calculator 202) converts the torque command $T_c$ into current commands, which may take the form of d/q current references $I_{dqc}$. Those current commands are then sent to a current controller module (e.g. current controller 206). The current controller 206 may be a feedback regulator utilizing current measurements or a feedforward compensator. The temperature T can be fed into a parameter compensator 204 to adjust the PMSM electrical parameters as necessary. The current controller 206 then generates the d/q voltage command, which are equivalent to a commanded modulation index $m_i$ and phase advance angle $\delta$. In other words, the current controller module generates the modulation index $m_i$ and phase advance angle $\delta$ based on the current commands. The modulation index $m_i$ and phase advance angle $\delta$ are converted to equivalent duty cycle $d_{ph}$ for each phase by the duty cycle generator 210 of the power converter commutation module 208.

Once the equivalent duty cycle $d_{ph}$ for each phase is generated, the pulse width modulator 212 then generates the on-times $t_{ph}$ for the different switches (e.g., FETs) in the phase legs of the power converter (e.g., the inverter 216). The inverter 216, powered by a source 214, then supplies the desired voltages to the motor (e.g., the PMSM 19), which produces currents $I_{ph}$ and electromagnetic torque $T_e$. The position $\theta_r$ and currents $I_{ph}$ are then measured and fed back to the position measurer 220 and the current measurer 222 respectively of the control system to close the control loop. The measured position $\theta_m$ is used with the phase currents to compute the d/q measured currents $I_{dqm}$ which are utilized for closed-loop current control. A voltage source inverter (VSI) is typically employed as the power converter in PMSM based electric drives.

While the design and structure of the actual machine are different for three phase and multiphase (greater than three phases) PMSMs, the same principle of vector control in the synchronous or d/q reference frame is possible for all these machines by using the appropriate transformation matrices for converting phase currents and voltages into the equivalent DC quantities in the synchronous frame. The present disclosure focuses on different techniques for the commutation of the power converter (e.g., the inverter 216) for a multiphase electric machine 19. In some example embodiments, the multiphase electric machine 19 is a permanent magnet synchronous motor (PMSM). However, the multiphase electric machine 19 may be any type of motor or motor/generator having four or more phases. The multiphase electric machine 19 may be, for example, an induction motor, a reluctance motor, or a permanent magnet motor.

Figure 3:
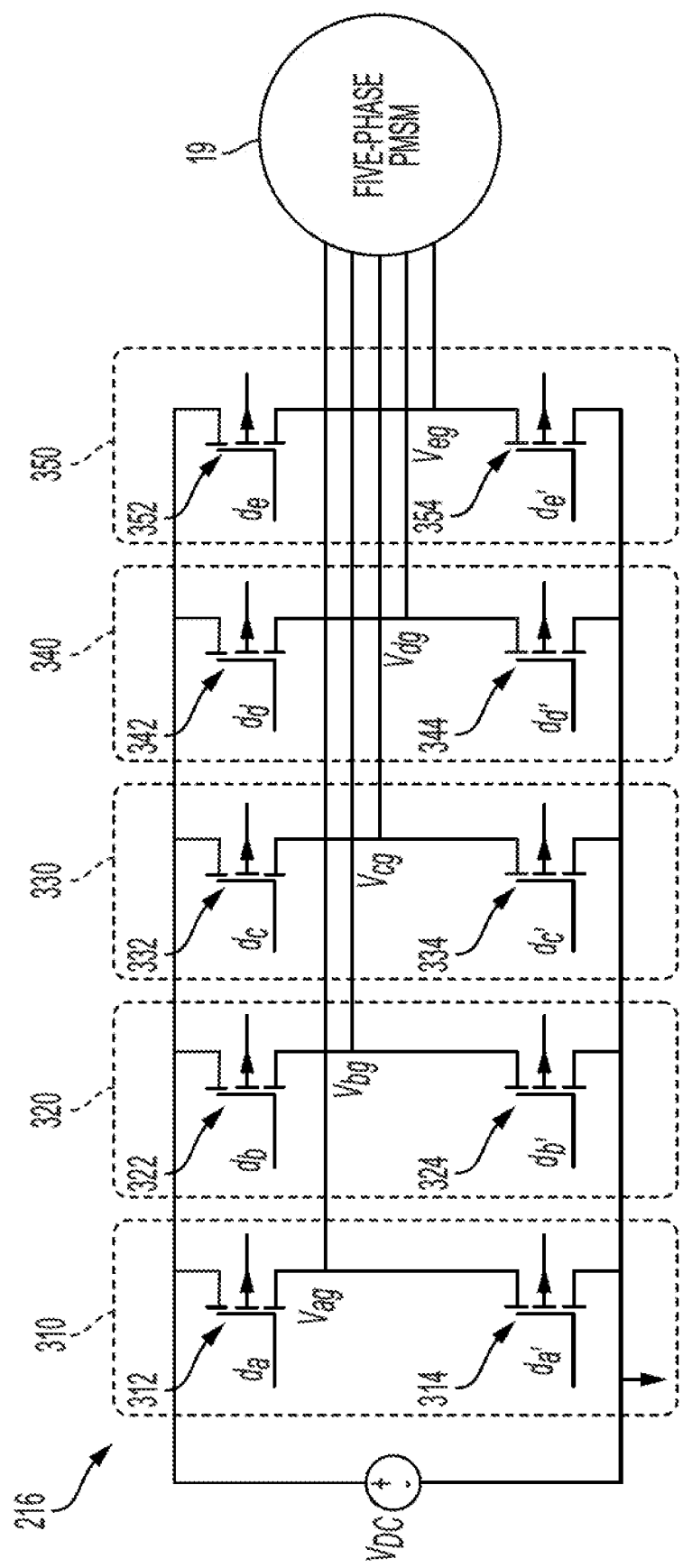
FIG. 3 depicts a block diagram of a voltage source inverter for a five-phase permanent magnet synchronous motor according to aspects of the present disclosure.

FIG. 3 depicts an example of the inverter 216 according to aspects of the present disclosure. Each of the five phases of the multiphase electric machine 19 (e.g., the PMSM 19) is connected to a corresponding phase leg that consists of two switches. For example, the inverter 216 includes five phase legs 310, 320, 330, 340, 350, each having two switches (e.g., the phase leg 310 includes switches 312, 314; the phase leg 320 includes switches 322, 324; the phase leg 330 includes switches 332, 334; the phase leg 340 includes switches 342, 344; the phase leg 350 includes switches 352, 354).

The duty cycles (equivalent to on-times) of the upper and lower switches (e.g., the switches 312, 314 represent the upper and lower switches respectively of the phase leg 310) are denoted as $d_x$ and $d_x'$ respectively, where x=a, b, c, d, e for the five phase legs. The phase to ground voltages are denoted as $V_{xg}$ (e.g., $V_{ag}$ for the phase leg 310, $V_{bg}$ for the phase leg 320, etc.). These voltages $V_{xg}$ are controlled via the duty cycles computed by the duty cycle generator 210 of FIG. 2.

One of the most straightforward continuous PWM schemes for multiphase AC machines is the sinusoidal PWM (SPWM) technique. The duty cycles for the SPWM scheme is mathematically expressed as follows:

$$d_{SPWM} = \frac{1}{2} + m_i \cos\left(\theta_r - (i-1)\frac{2\pi}{n}\right)$$

where $m_i$ is the modulation index, $\theta_r$ is the electrical position, n is the phase number, and i=0, 1, ... n−1. The SPWM scheme can generate sinusoidal voltages with relatively little harmonics. However, one disadvantage of the SPWM scheme is that the maximum AC output voltage is not optimal. For example, other PWM schemes exist that better utilize the DC bus to produce higher phase-to-phase output voltages than are provided using SPWM.

Other PWM schemes, such as space vector PWM (SVPWM), which may be continuous or discontinuous in nature, may be used to supply AC power to multiphase AC machines. SVPWM schemes have been proved to have a higher DC bus utilization when compared with the SPWM scheme. In other words, SVPWM schemes may provide a higher phase-to-phase output voltage than is provided using SPWM. This higher phase-to-phase output voltage can extend the torque speed capability of the multiphase machine with the same DC voltage.

The SPWM scheme may be used to obtain the generalized expression of the duty cycle for the discontinuous PWM minimum (DPWMMIN) technique as expressed in the following formula:

$$d_{DPWMMIN} = \frac{1}{2} +$$
$$\frac{1}{2\cos\left(\frac{\pi}{2n}\right)} m_i \left( \cos\left(\theta_r - (\alpha-1)\frac{2\pi}{n}\right) - \min(d_{SPWM\_1}, d_{SPWM\_2} \ldots d_{SPWM\_n}) \right)$$

The amplitude of the fundamental voltage with DPWM-MIN is $$\frac{1}{\cos\left(\frac{\pi}{2n}\right)},$$

which is greater than 1.

Figure 4:
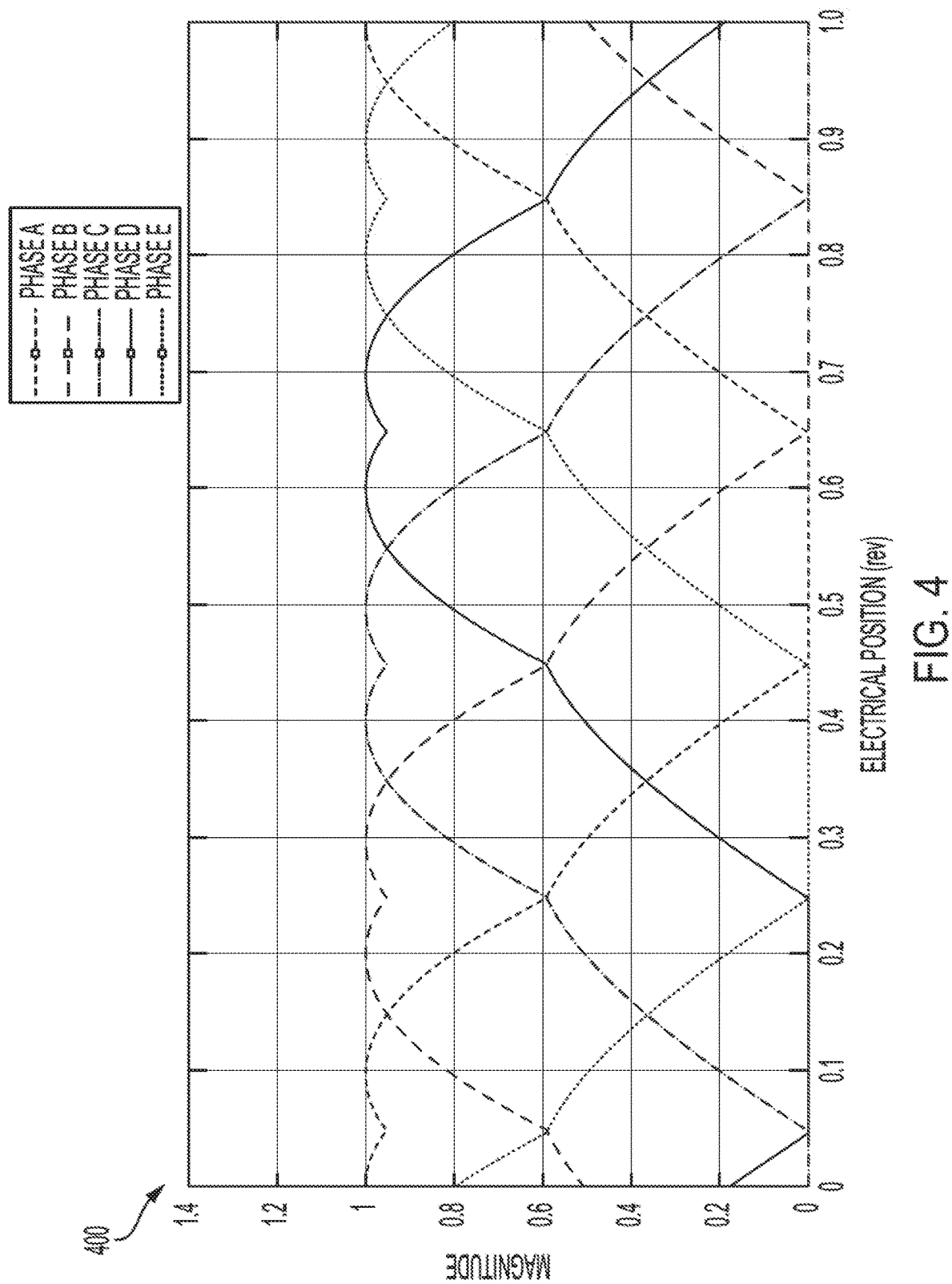
FIG. 4 depicts a graph of five-phase duty ratio waveforms of a discontinuous PWM minimum (DPWMMIN) scheme according to aspects of the present disclosure.

FIG. 4 depicts a graph 400 of five duty ratio waveforms A, B, C, D, E of a DPWMMIN scheme according to aspects of the present disclosure. Specifically, FIG. 4 depicts duty ratio waveforms for each of five phases A, B, C, D, E of the multiphase electric machine 19 produced using DPWM minimum (DPWMMIN) technique. The duty ratio waveforms for each of the DPWMMIN duty ratio waveforms A, B, C, D, E remains at zero for 1/n of an electrical revolution, where n is the number of phases of the multiphase electric machine 19.

The generalized SVPWM can be obtained from DPWM-MIN with the following equation:

$$d_{SVPWM} = d_{DPWMMIN} + \frac{1}{2} \times (1 - \max(d_{DPWMMIN}))$$

Figure 5:
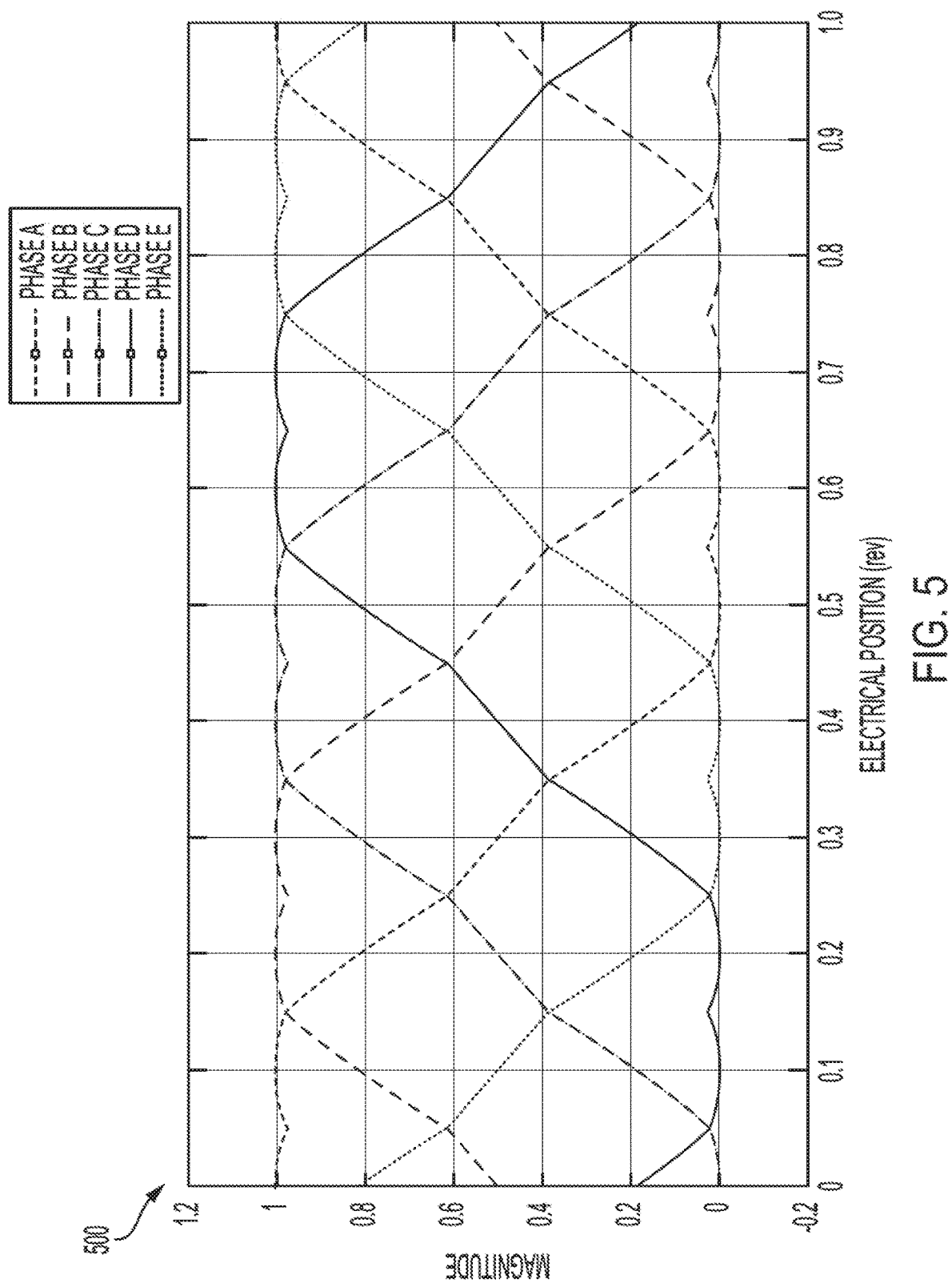
FIG. 5 depicts a graph of five-phase duty ratio waveforms of a continuous PWM (CPWM) scheme to aspects of the present disclosure.

FIG. 5 depicts a graph 500 of five duty ratio waveforms A, B, C, D, E of a continuous PWM (CPWM) scheme according to aspects of the present disclosure. Specifically, FIG. 5 depicts duty ratio waveforms for each of five phases A, B, C, D, E of the multiphase electric machine 19 produced using the continuous SVPWM scheme.

The above equation provides a generic way of computing CPWM from DPWMMIN, which can simplify the calculation compared to conventional methods. Additionally, by changing the coefficient ½ in the above equation, we can obtain a combination PWM scheme that produces PWM waveforms blended from CPWM and DPWMMIN. The combined adaptive PWM (APWM) can be written with the following equation:

$$d_{APWM} = d_{DPWMMIN} + \alpha \times (1 - \max(d_{DPWMMIN}))$$

where $\alpha$ is the blending coefficient which has a value of 0.0 to 0.5.

In some embodiments, a sinusoidal PWM scheme may be used to form the continuous PWM scheme in the combination PWM scheme. In some embodiments, a discontinuous PWM minimum (DPWMMIN) scheme may be used to form the noncontinuous PWM scheme used in the combination PWM scheme. Alternatively, or additionally, a discontinuous PWM minimum with offset (DPWMMINO) scheme may be used to form the noncontinuous PWM scheme used in the combination PWM scheme. In some embodiments, two or more different schemes may be used for either or both of the continuous PWM scheme and/or the noncontinuous PWM scheme used in the combination PWM scheme.

Figure 6:
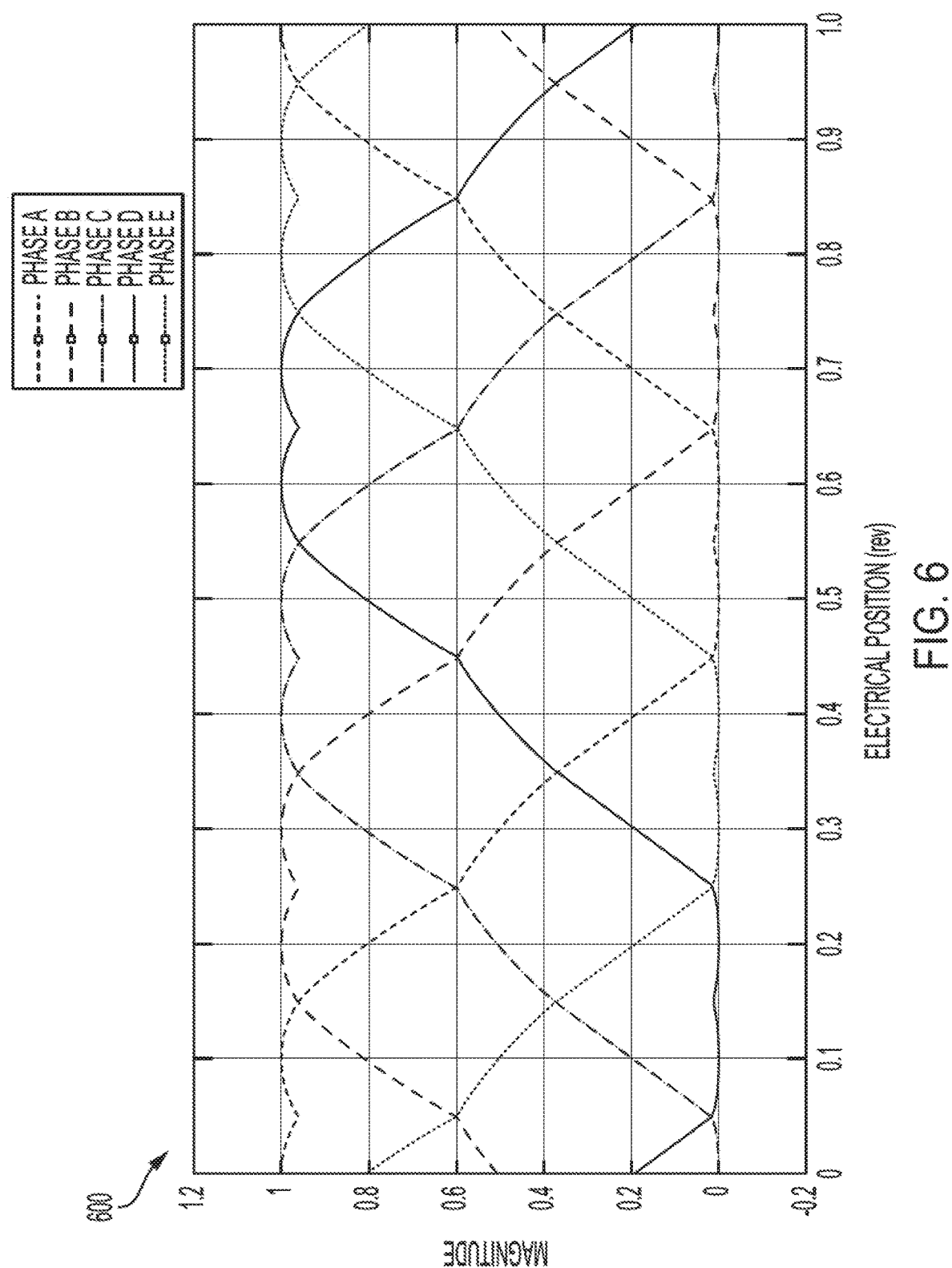
FIG. 6 depicts a graph of five-phase duty ratio waveforms of a combination of continuous and discontinuous PWM schemes according to aspects of the present disclosure.

FIG. 6 depicts a graph 600 of five-phase SVPWM duty ratio waveforms for each of five phases A, B, C, D, E of the multiphase electric machine 19 produced using the combination APWM scheme blended from CPWM and DPWM-MIN. Specifically, FIG. 6 depicts the duty ratio waveforms for each of five phases A, B, C, D, E of the multiphase electric machine 19 produced using the combination PWM scheme using a blending coefficient $\alpha = 0.2$.

Continuous PWM schemes, such as SVPWM, and discontinuous PWM schemes, such as DPWMMIN, each have their own advantages in certain operating conditions which do not overlap. By changing the value of the blending coefficient $\alpha$ according to different operating conditions, the combined PWM scheme can have the advantages of both PWMs in their favorable conditions and can switch between the two PWMs continuously and gradually. The blending coefficient $\alpha$ can be constructed as a function in order to maximize the advantages of the two PWMs. One example is to use the modulation index $m_i$ to determine the value of the blending coefficient $\alpha$.

In some embodiments, the value of the blending coefficient $\alpha$ is a function of a magnitude of a phase current supplied to or from the multiphase electric machine 19. In some embodiments, the value of the blending coefficient $\alpha$ is a function of a velocity of the multiphase electric machine 19. The velocity of the multiphase electric machine 19 may be a mechanical velocity, such as a rotational speed of an output shaft. Alternatively, the velocity of the multiphase electric machine 19 may be an electrical velocity, such as a rotational speed of a rotating magnetic field in a stator of the multiphase electric machine 19. In some embodiments, the value of the blending coefficient $\alpha$ is a function of a torque of the multiphase electric machine 19. For example, the blending coefficient may be a function of a commanded torque or an actual torque produced by the multiphase electric machine 19.

In some embodiments, the blending coefficient $\alpha$ may be determined using a piecewise function. One example of such a piecewise function is shown below. In the example piecewise function, the blending coefficient $\alpha$ is equal to a constant when the modulation index $m_i$ is outside of the range defined by $a_1$ and $a_2$ and is inversely proportional to the modulation index $m_i$ when the modulation index $m_i$ is within the range. Using such a piecewise linear function to determine the value of the blending coefficient $\alpha$ provides a smooth transition from SVPWM to DPWMMIN with only a few additional computations. An example of this function is as follows:

$$\alpha = \begin{cases} 0.5 & 0 \leq m_i < a_1 \\ 0.5 \times \left(1 - \frac{m_i - a_1}{a_2 - a_1}\right) & a_1 \leq m_i < a_2 \\ 0 & a_2 \leq m_i < 1 \end{cases}$$

In some embodiments, a blending function is used to determine relative weights of each of the continuous PWM scheme and the noncontinuous PWM scheme used to generate the n number of duty cycle signals. A signal generator (e.g. duty cycle generator 210) may perform the blending function to generate a blended PWM scheme in order to generate the n number of duty cycle signals. In some embodiments, the blending function is a piecewise function. Alternatively, or additionally, the blending function may be a continuous function of one or more different variables, such as modulation index $m_i$, phase current magnitude $I_s$, torque of the multiphase electric machine 19, and/or velocity of the multiphase electric machine 19.

Figure 7:
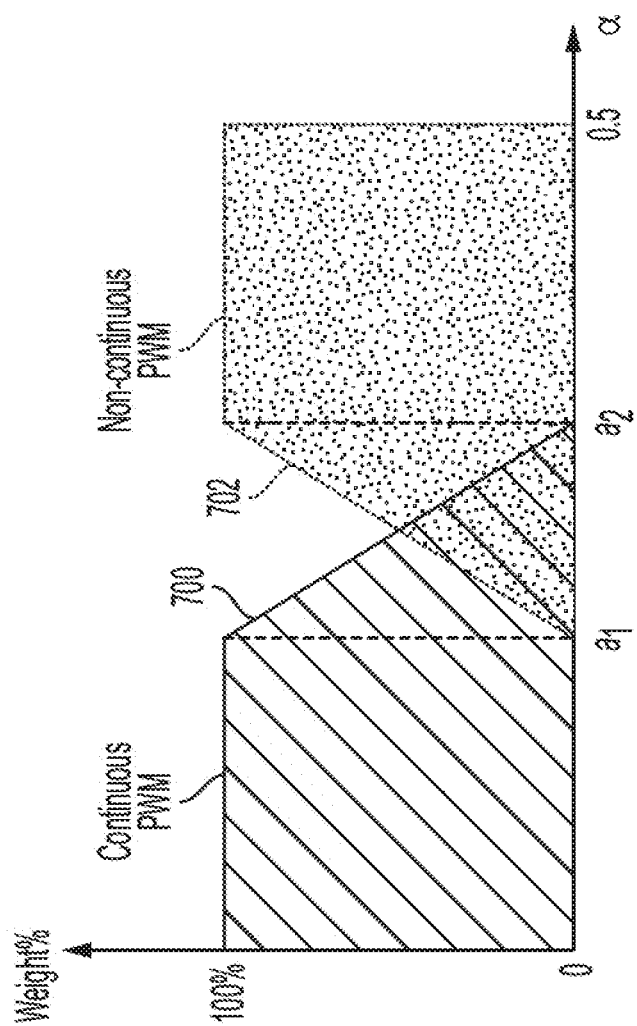
FIG. 7 is a graph illustrating an example of a blending function for combining a continuous and discontinuous PWM scheme according to aspects of the present disclosure.

FIG. 7 is a graph illustrating an example blending function for combining a continuous and noncontinuous PWM scheme according to aspects of the present disclosure. Specifically, FIG. 7 illustrates a piecewise blending function using the blending coefficient α. Curve 700 represents the percentage or weight given to a continuous PWM scheme as a function of blending coefficient α, and curve 702 represents the percentage or weight given to a noncontinuous PWM scheme as a function of blending coefficient α. As shown, the blending coefficient α is within a relatively low value range, the continuous PWM scheme (e.g. the SVPWM scheme) dominates. This low value range is shown as being between zero and a first threshold value $a_1$. When the blending coefficient α is within an intermediate value range, between the first threshold value $a_1$ and a larger second threshold value $a_2$, the continuous PWM scheme is blended with the noncontinuous PWM scheme (e.g. the DPWMMIN scheme) so that as the blending coefficient α increases, the relative weight of the noncontinuous PWM scheme increases until the noncontinuous PWM scheme dominates at blending coefficient α values greater than or equal to the second threshold value $a_2$.

In other words, the example blending function is calculated based on a difference between the blending coefficient α and the two threshold values $a_1$, $a_2$, where the second threshold value $a_2$ is larger than the first threshold value $a_1$. In some embodiments, each of the duty cycle signals are generated via the continuous PWM scheme based on the value of the blending coefficient α being less than the first threshold value $a_1$. In some embodiments, each of the duty cycle signals are generated via the noncontinuous PWM scheme based on the value of the blending coefficient a value being greater than or equal to a second threshold value $a_2$ that is greater than the first threshold value $a_1$. In some embodiments, the duty cycle signals are generated via the combination of the continuous PWM scheme and the noncontinuous PWM scheme based on the value of blending coefficient α being greater than or equal to the first threshold value $a_1$ and less than the second threshold value $a_2$.

In some embodiments, the blending function is a function of two or more variables. In one example, the blending function determines the blending coefficient α as a function of the modulation index $m_i$ and a phase current magnitude $I_s$ using the following formula:

$$\alpha(m_i, I_s) = \begin{cases} 0.5 & 0 \le \lambda < a_1 \\ 0.5 \times \left(1 - \frac{\lambda - a_1}{a_2 - a_1}\right) & a_1 \le \lambda < a_2 \\ 0 & a_2 \le \lambda < 1 \end{cases}$$

where λ is an intermediate variable defined by:

$$\lambda(m_i, I_s) = b \cdot \frac{I_s}{I_{smax}} + (1 - b) \cdot m_i, \quad 0 \le b \le 1$$

where b is a tunable constant and $I_{smax}$ is a maximal current of the motor 19.

Figure 8:
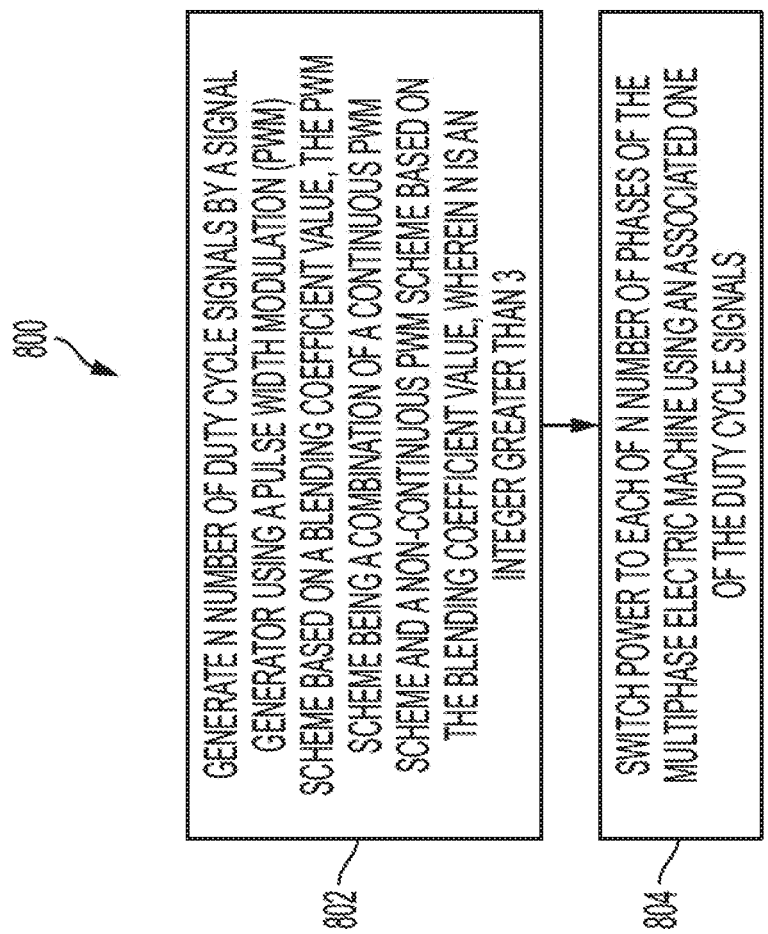
FIG. 8 depicts a flow diagram of a method for five-phase motor control in a steering system according to aspects of the present disclosure.

FIG. 8 illustrates a flow diagram of a method 800 of controlling a multiphase electric machine, such as an AC motor, according to aspects of the present disclosure. The method may be implemented in an EPS system 40 as depicted in FIG. 1, for example, or in any other suitable machine or system. FIG. 4 is now described with reference to elements from FIGS. 1 and/or 2.

At block 802, a processing device, such as the duty cycle generator 210, generates n number of duty cycle signals using a pulse width modulation (PWM) scheme, with n being an integer greater than 3. The PWM scheme that is used, which may be called a combined PWM scheme, is a combination of a continuous PWM scheme and a noncontinuous PWM scheme, with the combination based on a blending coefficient value α. More specifically, the blending coefficient value α determines the weight or amount that each of the continuous PWM scheme and the noncontinuous PWM scheme within the combined PWM scheme and which are used to generate the duty cycle signals.

In some embodiments, the continuous PWM scheme used in block 802 is a sinusoidal PWM scheme. In some embodiments, the noncontinuous PWM scheme used in block 802 is a discontinuous PWM minimum (DPWMMIN) scheme or a discontinuous PWM minimum with offset (DPWMMINO) scheme.

At block 804, a power converter, such as the inverter 216, switches power to each of n number of phases of the multiphase electric machine 19 using an associated one of the duty cycle signals.

In some embodiments, the method 800 of controlling the multiphase electric machine 19 also includes receiving a torque command and outputting a current command by a current command module, such as the current controller 206. The method may further include generating a modulation index value based on the current command. In some embodiments, the method includes determining the blending coefficient value α as a function of the modulation index value $m_i$. In some embodiments, the value of the blending coefficient α is equal to the value of the modulation index $m_i$ times a scaling constant. In some embodiments, the scaling constant is between 0.5 and 1.0. More specifically, in some embodiments, the scaling constant may be equal to 0.5, so the blending coefficient α=0.5 times the modulation index $m_i$.

In some embodiments, the method 800 further comprises determining relative weights of each of the continuous PWM scheme and the noncontinuous PWM scheme using a blending function based on a difference between the blending coefficient value and two threshold values.

In some embodiments, and as illustrated on FIG. 7, the blending function is calculated based on a difference between the blending coefficient α and the two threshold values $a_1$, $a_2$, where the second threshold value $a_2$ is larger than the first threshold value $a_1$. In some embodiments, each of the duty cycle signals are generated via the continuous PWM scheme based on the value of the blending coefficient a being less than the first threshold value $a_1$. In some embodiments, each of the duty cycle signals are generated via the noncontinuous PWM scheme based on the value of the blending coefficient α value being greater than or equal to a second threshold value $a_2$ that is greater than the first threshold value $a_1$. In some embodiments, the duty cycle signals are generated via the combination of the continuous PWM scheme and the noncontinuous PWM scheme based on the value of blending coefficient α being greater than or equal to the first threshold value $a_1$ and less than the second threshold value $a_2$.

In some embodiments, the value of the blending coefficient α is calculated based on a difference between the value of the modulation index $m_i$ and the two threshold values $a_1$, $a_2$. In some embodiments, each of the duty cycle signals are generated via the continuous PWM scheme based on the value of the modulation index $m_i$ being less than the first threshold value $a_1$. In some embodiments, each of the duty cycle signals are generated via the noncontinuous PWM scheme based on the value of the modulation index $m_i$ value being greater than or equal to the second threshold value $a_2$ that is greater than the first threshold value $a_1$. In some embodiments, the duty cycle signals are generated via the combination of the continuous PWM scheme and the noncontinuous PWM scheme based on the value of the modulation index $m_i$ being greater than or equal to the first threshold value $a_1$ and less than the second threshold value $a_2$.

In some embodiments, the combination is calculated based on the following relation: $d_{APWM}=d_{DPWMMIN}+\alpha \times (1-\max(d_{DPWMMIN}))$, wherein $d_{APWM}$ is one of the duty cycle signals, $d_{DPWMMIN}$ is a duty cycle calculated based on the noncontinuous PWM scheme, and $\max(d_{DPWMMIN})$ is a maximum value of the duty cycle, and $\alpha$ is the blending coefficient.

In some embodiments, the multiphase electric machine 19 is configured to apply an assist torque to a steering system of a vehicle and/or to control the steering system of the vehicle.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate in scope with the present disclosure. Additionally, while various embodiments of the present disclosure have been described, it is to be understood that aspects of the present disclosure may include only some of the described embodiments or combinations of the various embodiments. Accordingly, the present disclosure is not to be seen as limited by the foregoing description.

What is claimed is:

1. A control system for controlling operation of a multiphase electric machine, comprising:
   a signal generator configured to generate n number of duty cycle signals of a pulse width modulation (PWM) scheme as a combination of a continuous PWM scheme and a noncontinuous PWM scheme, where the combination is based on a blending coefficient value, the signal generator configured to use each of the duty cycle signals to control switching of a DC power to a corresponding phase of the multiphase electric machine;
   wherein n is an integer greater than 3;
   wherein the signal generator is configured to use a blending function to determine relative weights of each of the continuous PWM scheme and the noncontinuous PWM scheme to generate the n number of duty cycle signals;
   wherein the blending function is calculated based on a difference between the blending coefficient value and two threshold values; and
   wherein the duty cycle signals are generated via the combination of the continuous PWM scheme and the noncontinuous PWM scheme based on the blending coefficient value being greater than or equal to a first threshold value and less than a second threshold value, the second threshold value greater than the first threshold value.

2. The control system of claim 1, wherein the continuous PWM scheme is a sinusoidal PWM scheme.

3. The control system of claim 1, wherein the noncontinuous PWM scheme is one of a discontinuous PWM minimum (DPWMMIN) scheme and a discontinuous PWM minimum with offset (DPWMMINO) scheme.

4. The control system of claim 1, further comprising:
   a current command module configured to receive a torque command and output a current command;
   a current controller module configured to generate a modulation index value based on the current command; and
   wherein the blending coefficient value is a function of the modulation index value.

5. The control system of claim 1, wherein the duty cycle signals are generated via the continuous PWM scheme based on the blending coefficient value being less than a first threshold value; and
   wherein the duty cycle signals are generated via the noncontinuous PWM scheme based on the blending coefficient value being greater than or equal to a second threshold value greater than the first threshold value.

6. The control system of claim 1, wherein the blending coefficient value is a function of a phase current magnitude or a velocity or a torque of the multiphase electric machine.

7. A control system for controlling operation of a multiphase electric machine, comprising:
   a signal generator configured to generate n number of duty cycle signals of a pulse width modulation (PWM) scheme as a combination of a continuous PWM scheme and a noncontinuous PWM scheme, where the combination is based on a blending coefficient value, the signal generator configured to use each of the duty cycle signals to control switching of a DC power to a corresponding phase of the multiphase electric machine; and
   wherein n is an integer greater than 3;
   wherein the combination is calculated based on the following relation:

$$d_{APWM}=d_{DPWMMIN}+\alpha \times (1-\max(d_{DPWMMIN}))$$

wherein $d_{APWM}$ is one of the duty cycle signals, $d_{DPWMMIN}$ is a duty cycle calculated based on the noncontinuous PWM scheme, and $\max(d_{DPWMMIN})$ is a maximum value of the duty cycle, and $\alpha$ is the blending coefficient value.

8. The control system of claim 1, wherein the multiphase electric machine is configured to perform at least one of: applying an assist torque to a steering system of a vehicle, and controlling the steering system.

9. A method of controlling a multiphase electric machine, comprising:
   generating n number of duty cycle signals by a signal generator using a pulse width modulation (PWM) scheme being a combination of a continuous PWM scheme and a noncontinuous PWM scheme, where the combination is based on a blending coefficient value, wherein n is an integer greater than 3; and
   switching power to each of n number of phases of the multiphase electric machine using an associated one of the duty cycle signals; and
   determining relative weights of each of the continuous PWM scheme and the noncontinuous PWM scheme using a blending function based on a difference between the blending coefficient value and two threshold values;
   wherein the duty cycle signals are generated via the combination of the continuous PWM scheme and the noncontinuous PWM scheme based on the blending coefficient value being greater than or equal to a first threshold value and less than a second threshold value, the second threshold value greater than the first threshold value.

10. The method of claim 9, wherein the continuous PWM scheme is a sinusoidal PWM scheme.

11. The method of claim 9, wherein the noncontinuous PWM scheme is one of a discontinuous PWM minimum (DPWMMIN) scheme and a discontinuous PWM minimum with offset (DPWMMINO) scheme.

12. The method of claim 9, further comprising:
receiving a torque command and outputting a current command by a current command module;
generating a modulation index value based on the current command; and
wherein the blending coefficient value is a function of the modulation index value.

13. The method of claim 9, wherein each of the duty cycle signals are generated via the continuous PWM scheme based on the blending coefficient value being less than a first threshold value; and
wherein each of the duty cycle signals are generated via the noncontinuous PWM scheme based on the blending coefficient value being greater than or equal to a second threshold value greater than the first threshold value.

14. The method of claim 9, wherein the blending coefficient value is a function of a phase current magnitude or a velocity or a torque of the multiphase electric machine.

15. The method of claim 9, wherein the combination is calculated based on the following relation:

$$d_{APWM} = d_{DPWMMIN} + \alpha \times (1\ \max(d_{DPWMMIN}))$$

wherein $d_{APWM}$ is one of the duty cycle signals, $d_{DPWMMIN}$ is a duty cycle calculated based on the noncontinuous PWM scheme, and $\max(d_{DPWMMIN})$ is a maximum value of the duty cycle, and a is the blending coefficient value.

16. The method of claim 9, wherein the multiphase electric machine is configured to perform at least one of: applying an assist torque to a steering system of a vehicle, and controlling the steering system.

* * * * *